(12) United States Patent
Park et al.

(10) Patent No.: US 10,853,017 B2
(45) Date of Patent: Dec. 1, 2020

(54) DISPLAY APPARATUS HAVING MULTIPLE DISPLAYS

(71) Applicant: SAMSUNG ELECTRONICS CO., LTD., Suwon-si (KR)

(72) Inventors: Jin Su Park, Suwon-si (KR); Chae Joo Son, Suwon-si (KR); Do Sung Jung, Suwon-si (KR); Sae Rom Hong, Suwon-si (KR); Min Hee Lee, Suwon-si (KR); Ji Hye Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/289,220

(22) Filed: Feb. 28, 2019

(65) Prior Publication Data

US 2019/0265940 A1 Aug. 29, 2019

(30) Foreign Application Priority Data

Feb. 28, 2018 (KR) .................. 10-2018-0024521

(51) Int. Cl.
| | |
|---|---|
| *G09G 5/00* | (2006.01) |
| *G06F 3/14* | (2006.01) |
| *H01R 13/10* | (2006.01) |
| *H01R 31/06* | (2006.01) |
| *H01R 13/621* | (2006.01) |

(52) U.S. Cl.
CPC .......... *G06F 3/1446* (2013.01); *H01R 13/10* (2013.01); *H01R 31/06* (2013.01); *G09G 2300/026* (2013.01); *H01R 13/621* (2013.01)

(58) Field of Classification Search
CPC ....... G06F 3/1446; H01R 31/06; H01R 13/10; H01R 13/621
USPC .......................................................... 345/1.3
See application file for complete search history.

(56) References Cited

U.S. PATENT DOCUMENTS

| | | | |
|---|---|---|---|
| 2005/0116667 A1 | 6/2005 | Mueller et al. | |
| 2009/0296026 A1* | 12/2009 | Bae .................. | G02F 1/133615 349/65 |
| 2010/0097294 A1* | 4/2010 | Kastrup ................ | G06F 3/1446 345/1.3 |
| 2011/0018494 A1 | 7/2011 | Wong et al. | |
| 2013/0181884 A1 | 7/2013 | Perkins et al. | |
| 2014/0218348 A1* | 8/2014 | Khongbantabam .. | G09G 3/2088 345/212 |

(Continued)

FOREIGN PATENT DOCUMENTS

| | | |
|---|---|---|
| KR | 10-2013-0070101 | 6/2013 |
| KR | 10-2014-0035739 | 3/2014 |

(Continued)

OTHER PUBLICATIONS

Partial European Search Report dated May 21, 2019 in corresponding European Patent Application No. 19159777.2.

(Continued)

*Primary Examiner* — Adam J Snyder
(74) *Attorney, Agent, or Firm* — Staas & Halsey LLP (57) ABSTRACT

A display apparatus including a plurality of displays arranged adjacent to each other, and a connector coupled to adjacent ends of the plurality of displays to couple the plurality of displays to each other, wherein the connector electrically connects the plurality of displays.

15 Claims, 13 Drawing Sheets

(56) References Cited

U.S. PATENT DOCUMENTS

| | | | | |
|---|---|---|---|---|
| 2014/0375529 | A1* | 12/2014 | Yun | G06F 3/1446 |
| | | | | 345/1.3 |
| 2015/0362160 | A1* | 12/2015 | Andreasen | G06F 3/1446 |
| | | | | 362/97.1 |
| 2017/0093106 | A1* | 3/2017 | Hochman | G06F 3/1446 |
| 2017/0220310 | A1* | 8/2017 | Hochman | G06F 3/1446 |
| 2017/0359916 | A1* | 12/2017 | Hochman | G09F 9/30 |
| 2017/0374753 | A1 | 12/2017 | Xu et al. | |
| 2019/0196773 | A1* | 6/2019 | Miles | G02F 1/133308 |

FOREIGN PATENT DOCUMENTS

| | | |
|---|---|---|
| KR | 20-0478417 | 10/2015 |
| KR | 10-2016-0076765 | 7/2016 |
| WO | WO 2009/069076 | 6/2009 |
| WO | WO 2009/122325 | 10/2009 |
| WO | WO 2017/103622 | 6/2017 |

OTHER PUBLICATIONS

International Search Report dated Jul. 3, 2019 in corresponding International Patent Application No. PCT/KR2019/002366.
Written Opinion of the International Searching Authority dated Jul. 3, 2019 in corresponding International Patent Application No. PCT/KR2019/002366.
Extended European Search Report dated Aug. 23, 2019 in corresponding European Patent Application No. 19159777.2.

* cited by examiner

DISPLAY APPARATUS HAVING MULTIPLE DISPLAYS

CROSS-REFERENCE TO RELATED APPLICATION(S)

This application is based on and claims priority under 35 U.S.C. § 119 to Korean Patent Application No. 10-2018-0024521, filed on Feb. 28, 2018 in the Korean Intellectual Property Office, the disclosure of which is incorporated by reference herein in its entirety.

BACKGROUND

1. Technical Field

The present disclosure relates to a display apparatus including a plurality of displays.

2. Description of the Related Art

A display apparatus is an apparatus that receives an image signal and displays an image on a screen. An example of the display apparatus is a television, a monitor, and the like.

As another example of the display apparatus, there is a multivision in which a plurality of displays, in each of which an image is displayed, are arranged vertically and horizontally to display one large image.

In a case where the display apparatus operates as a multivision, cables for transmission of power and image signals are connected to each of the displays.

SUMMARY

It is an aspect of the present disclosure to provide a display apparatus in which a plurality of displays may be connected more easily.

Additional aspects of the present disclosure will be set forth in part in the description which follows and, in part, will be apparent from the description, or may be learned by practice of the present disclosure.

In accordance with an aspect of the present disclosure, a display apparatus includes a plurality of displays, and a connector to couple the plurality of displays of the plurality of displays arranged next to each other, and the connector electrically connects the adjacent displays.

The display apparatus further includes plug portions provided on one of the plurality of displays and the connector, and socket portions provided on an other one of the adjacent displays and the connector.

The adjacent displays include a first display and a second display disposed adjacent to the first display, the connector includes a connector base formed in a shape of a flat plate, a first coupling protrusion protruding from one side of a front surface of the connector base to be coupled to the first display, and a second coupling protrusion protruding from an other side of the front surface of the connector base to be coupled to the second display, and the first display and the second display respectively include a first coupling groove provided on one side of a rear surface thereof and to which the first coupling protrusion is coupled, and a second coupling groove provided on an other side thereof and to which the second coupling protrusion is coupled.

The plug portions respectively protrude from the first coupling protrusion and the second coupling protrusion, and the socket portions are respectively provided to be recessed in the first coupling groove and the second coupling groove in order to receive the first coupling protrusions and the second coupling protrusions therein.

The plug portions respectively protrude from a front surface of the connector base, and the socket portions are respectively provided to be recessed on opposite sides of the rear surface of the first display and the second display.

The connector includes a clip portion protruding from a rear surface of the connector base and extending downward.

The adjacent displays include a first display and a second display disposed adjacent to the first display, the connector includes a connector base having a L-shaped horizontal cross section, a first coupling protrusion protruding from one side of a front surface of the connector base to be coupled to the first display, and a second coupling protrusion protruding from an other side of the front surface of the connector base to be coupled to the second display, and the first display and the second display each include a first coupling groove provided on one side of a rear surface thereof and to which the first coupling protrusion is coupled, and a second coupling groove provided on an other side of the rear surface thereof and to which the second coupling protrusion is coupled.

The connector includes a support portion provided in a shape of a square protrusion on an inner side of a corner forming portion to support adjacent side ends of the first display and the second display.

The display apparatus further includes an upper plate mounted on an upper end of the plurality of displays, and a lower plate mounted on a lower end of the plurality of displays.

Each of the upper plate and the lower plate includes a fixed rail to fix the upper plate and the lower plate to the plurality of displays, and each of the plurality of displays includes a fixing slot into which the fixed rail is inserted.

The fixed rail provided at the upper plate includes an extension portion extending downward from a rear end of the upper plate and then extending forward, and a head portion formed at a front end of the extension portion to be thicker than the extension portion, the fixed rail provided at the lower plate includes an extension portion extending upward from a rear end of the lower plate and then extending forward, and a head portion formed at a front end of the extension portion to be thicker than the extension portion, and the fixing slots are horizontally provided at upper and lower portions of the rear surface of the plurality of displays, respectively, and include a passing portion formed to have a vertical width larger than a thickness of the head portion so that the head portion passes through the passing portion, and a locking portion formed to have a vertical width smaller than the thickness of the head portion so that the head portion is locked to the locking portion.

The display apparatus further includes a pair of side plates mounted on opposite ends of the plurality of displays.

The plurality of displays extend horizontally and are arranged horizontally adjacent to each other.

The plurality of displays extend vertically and are arranged vertically adjacent to each other.

In accordance with another aspect of the present disclosure, a display apparatus includes a plurality of displays arranged adjacent to each other, an upper plate mounted on an upper end of the plurality of displays, and a lower plate mounted on a lower end of the adjacent displays.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

The embodiments described herein and the configurations shown in the drawings are only examples of preferred embodiments of the present disclosure, and various modifications may be made at the time of filing of the present disclosure to replace the embodiments and drawings of the present specification.

Like reference numbers or designations in the various figures of the present application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front," "rear," "upper," "lower," "left," and "right" are defined with reference to the drawings, and the shape and position of each component are not limited by these terms.

Hereinafter, a display apparatus according to a first embodiment of the present disclosure will be described in detail with reference to the accompanying drawings.

Figure 1:
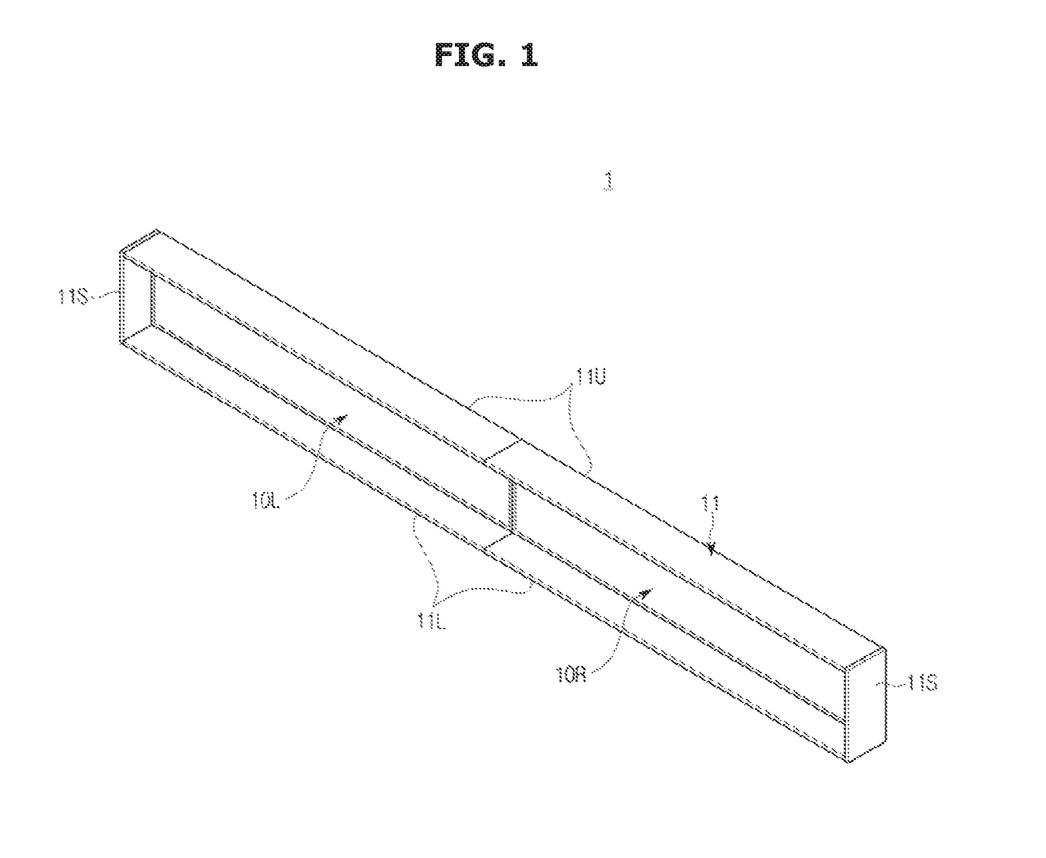
FIG. 1 is a perspective view of a display apparatus according to a first embodiment of the present disclosure.

As illustrated in FIG. 1, a display apparatus 1 includes a plurality of displays 10L and 10R to display an image, and a frame 11 arranged on the upper and lower sides and the right and left sides of the displays 10L and 10R so that the display apparatus 1 forms a shelf shape.

Figure 2:
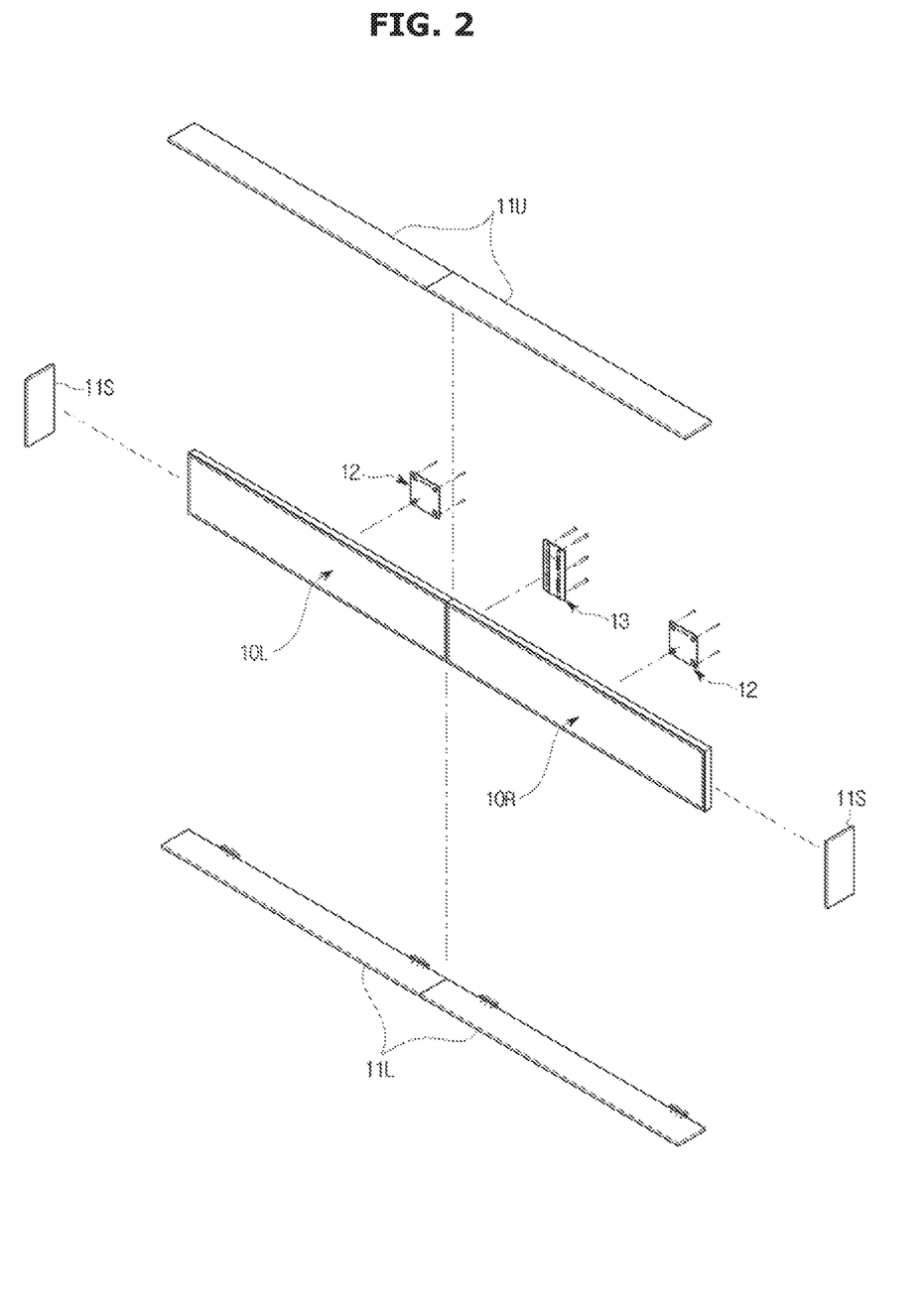
FIG. 2 is a front exploded perspective view of a display apparatus according to a first embodiment of the present disclosure.
Figure 3:
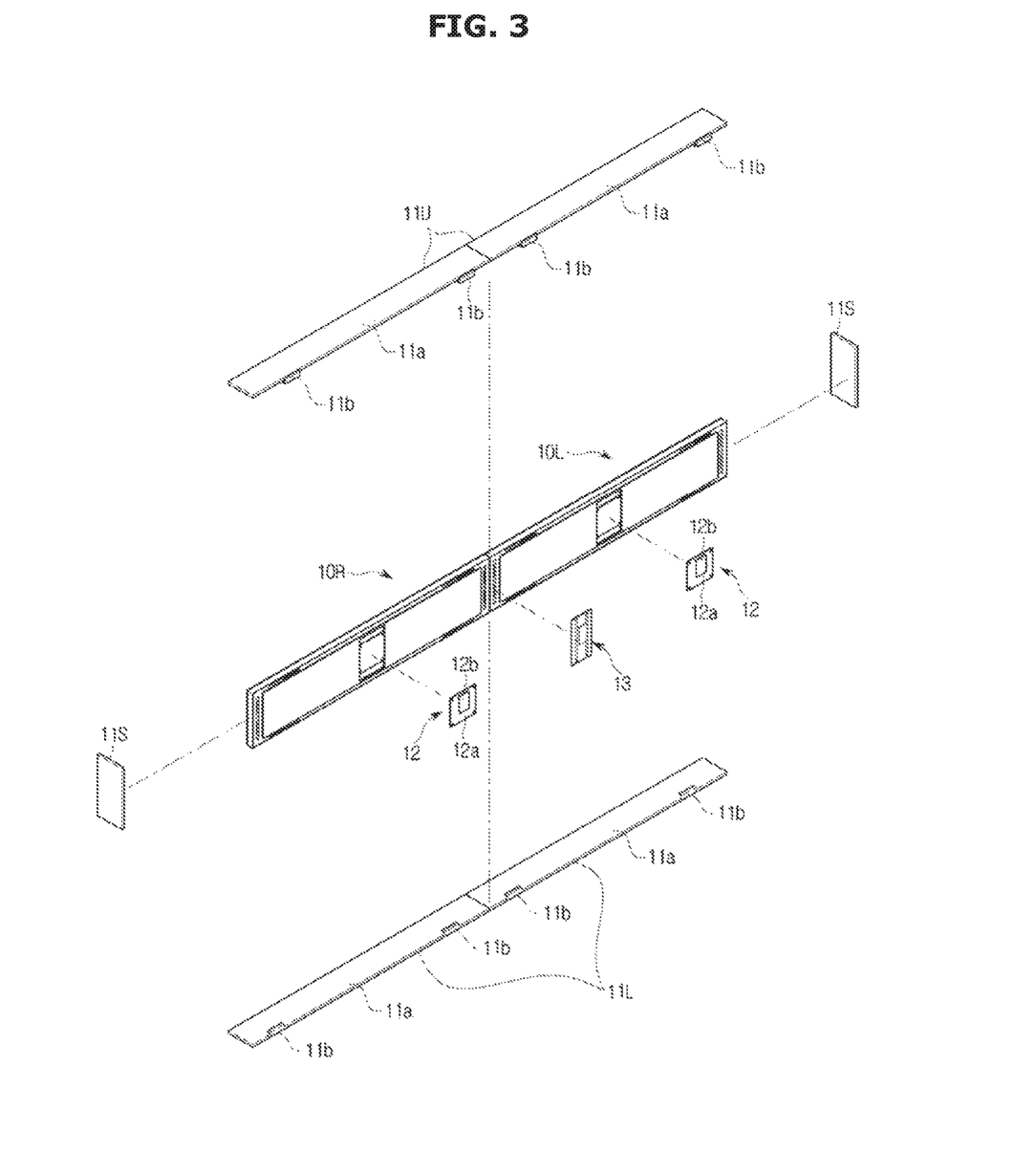
FIG. 3 is a rear exploded perspective view of a display apparatus according to a first embodiment of the present disclosure.

As illustrated in FIGS. 2 and 3, the plurality of displays 10L and 10R are formed in the shape of a long rectangular plate elongated in the left and right direction, and are arranged so as to be in contact with each other on the right and left sides. Each of the plurality of displays 10L and 10R may display one image, and the images displayed in the plurality of displays 10L and 10R may form one large image. That is, the display apparatus 1 may operate as a multivision.

The displays 10L and 10R include a liquid crystal display (LCD), light emitting diodes (LEDs), micro light emitting diodes (micro LEDs), organic light emitting diodes (OLEDs), and the like, through which an image is displayed.

Hereinafter, for convenience of description, the display 10L positioned on the left side of the two displays 10L and 10R will be referred to as the first display 10L and the display 10R positioned on the right side will be referred to as the second display 10R.

The first embodiment exemplifies that the display apparatus 1 includes the two first and second displays 10L and 10R, but it is also possible to arrange three or more displays side by side.

The frame 11 includes an upper plate 11U provided at upper ends of the first display 10L and the second display 10R to form an upper surface of the display apparatus 1, a lower plate 11L provided at lower ends of the first display 10L and the second display 10R to form a lower surface of the display apparatus 1, and a pair of side plates 11S covering opposite sides of the first and second displays 10L and 10R to form opposite sides of the display apparatus 1.

The upper plate 11U and the lower plate 11L are formed in substantially the same shape, except that their upper and lower surfaces are inverted.

Figure 4:
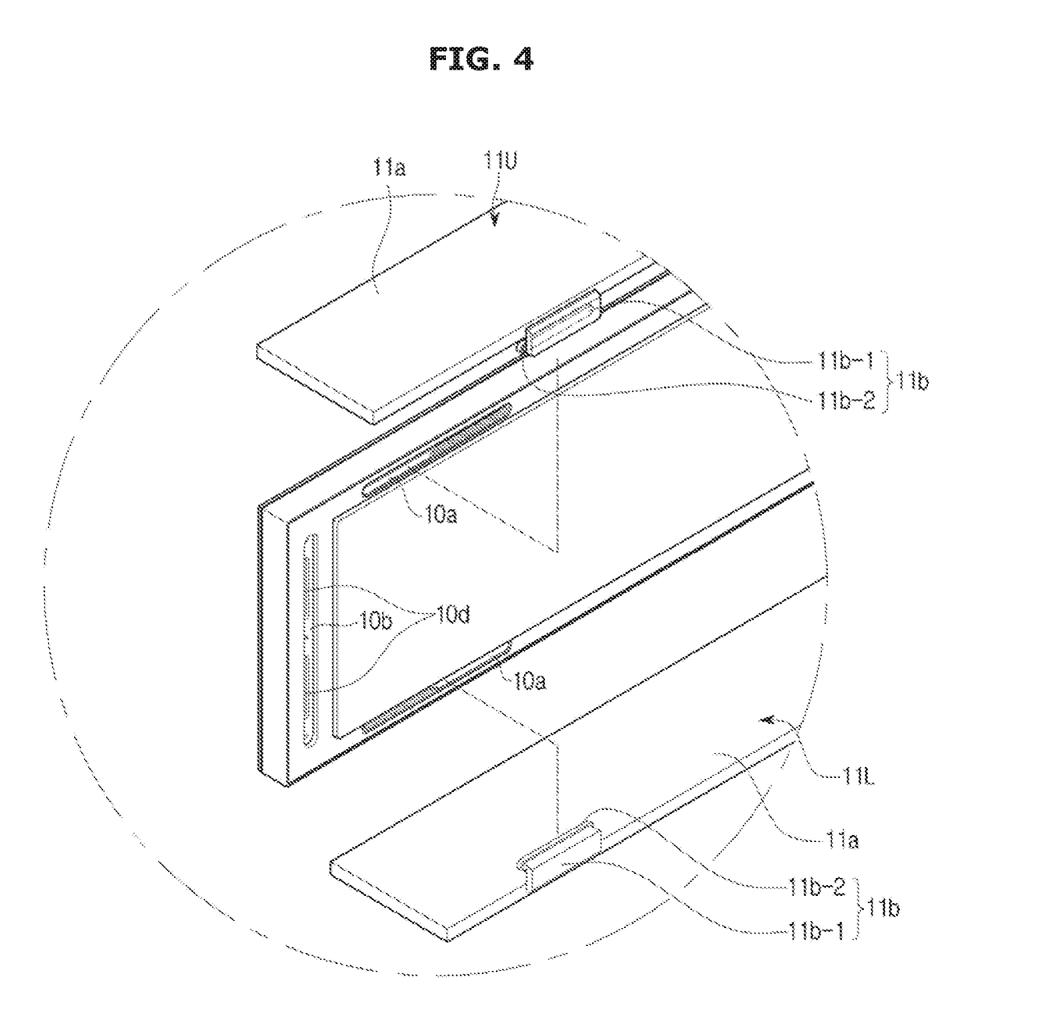
FIG. 4 is an exploded perspective view illustrating that an upper plate and a lower plate are mounted on a display in a display apparatus according to a first embodiment of the present disclosure.

As illustrated in FIG. 4, the upper plate 11U and the lower plate 11L include a plate portion 11a formed horizontally in the form of a rectangular plate elongated in the left and right direction and forming a shelf shape, and at least one fixed rail 11b coupled to a rear end of the plate portion 11a so that the upper plate 11U and the lower plate 11L may be mounted on upper and lower ends of the first and second displays 10L and 10R, respectively. Each of the upper plate 11U and the lower plate 11L includes two of the fixed rails 11b.

The fixed rail 11b provided at the upper plate 11U includes an extension portion 11b-1 extending downward from a rear end of the upper plate 11U and then extending forward, and a head portion 11b-2 formed at a front end of the extension portion 11b-1 to be thicker than the extension portion 11b-1. Similarly, the fixed rail 11b provided at the lower plate 11L includes the extension portion 11b-1 extending upward from a rear end of the lower plate 11L and then extending forward, and the head portion 11*b*-2 formed at the front end of the extension portion 11*b*-1 to be thicker than the extension portion 11*b*-1.

One of the pair of side plates 11S is fixed to a left end of the first display 10L positioned on the left side and the other is fixed to a right end of the second display 10R positioned on the right side.

Figure 5:
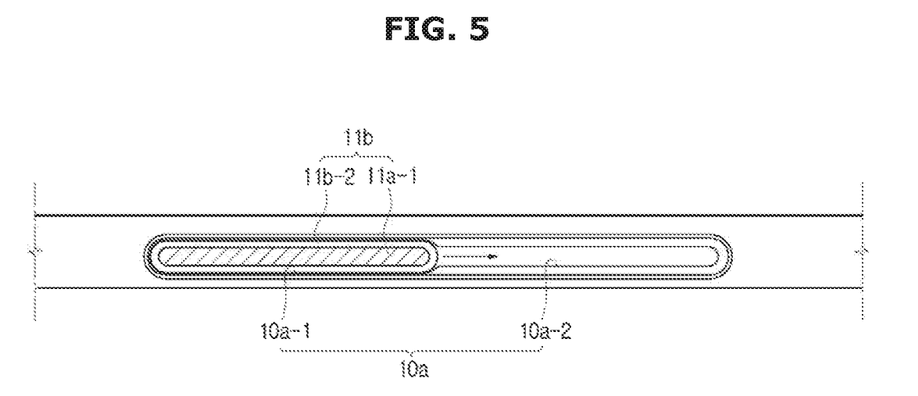
FIG. 5 is a view illustrating that a fixed rail is inserted into a fixing slot in a display apparatus according to a first embodiment of the present disclosure.

Each of the first and second displays 10L and 10R includes fixing slots 10*a* provided at upper and lower portions of a rear surface thereof, respectively, into which the fixed rails 11*b* are inserted. As illustrated in FIG. 5, the fixing slot 10*a* is elongated in a horizontal direction, and includes a passing portion 10*a*-1 that is formed on one side of the fixing slot 10*a* and has a vertical width larger than a thickness of the head portion 11*b*-2 so that the head portion 11*b*-2 passes through the passing portion 10*a*-1, and a locking portion 10*a*-2 that is formed on the other side of the fixing slot 10*a* and has a vertical width smaller than the thickness of the head portion 11*b*-2 so that the head portion 11*b*-2 is locked to the locking portion 10*a*-2.

With the above structure, when the head portions 11*b*-2 of the upper plate 11U and the lower plate 11L pass through the fixing slots 10*a* through the passing portions 10*a*-1 provided on the one side of the fixing slots 10*a* and then the fixed rails 11*b* are moved to the locking portions 10*a*-2 formed on the other sides of the fixing slots 10*a* by moving the upper plate 11U and the lower plate 11L in a horizontal direction toward the locking portions 10*a*-2, the movement of the upper plate 11U and the lower plate 11L in a rearward direction is limited because the head portion 11*b*-2 having the thickness larger than the vertical width of the locking portion 10*a*-2 may not pass through the locking portion 10*a*-2.

In this state, when the side plates 11S are fixed to the first and second displays 10L and 10R, the movement of the upper plate 11U and the lower plate 11L in a lateral direction is also limited by the side plates 11S, so that the upper plate 11U and the lower plate 11L are fixed to the upper and lower ends of the first and second displays 10L and 10R, respectively.

Accordingly, a rectangular shelf shape is formed by the upper plate 11U, the lower plate 11L and the pair of side plates 11S.

As illustrated in FIGS. 2 and 3, the display apparatus 1 further includes a clip member 12 coupled to each of the first and second displays 10L and 10R so that the first and second displays 10L and 10R may be mounted on a wall of a building. Although not shown in the drawings, mounting brackets may be fixed to the wall of the building so that the display apparatus 1 may be mounted on the wall through the clip members 12.

The clip member 12 is mounted on the center of the rear surface of each of the first and second displays 10L and 10R, and includes a clip base 12*a* fixed to the rear surface of each of the first and second displays 10L and 10R, and a clip portion 12*b* protruding from a rear surface of the clip base 12*a* and mounted on each of the mounting brackets. Although the present embodiment exemplifies that the clip member 12 is coupled to each of the first and second displays 10L and 10R, a plurality of clip members may be coupled to each of the first and second displays 10L and 10R.

The clip base 12*a* is formed in the shape of a rectangular plate and is fixed to the center of the rear surface of each of the first and second displays 10L and 10R through a fastening member such as a screw.

The clip portion 12*b* protrudes from the rear surface of the clip base 12*a* and extends downward. Therefore, the first and second displays 10L and 10R provided with the clip member 12 are hooked on the mounting bracket through the clip portion 12*b* and mounted on the wall.

Figure 6:
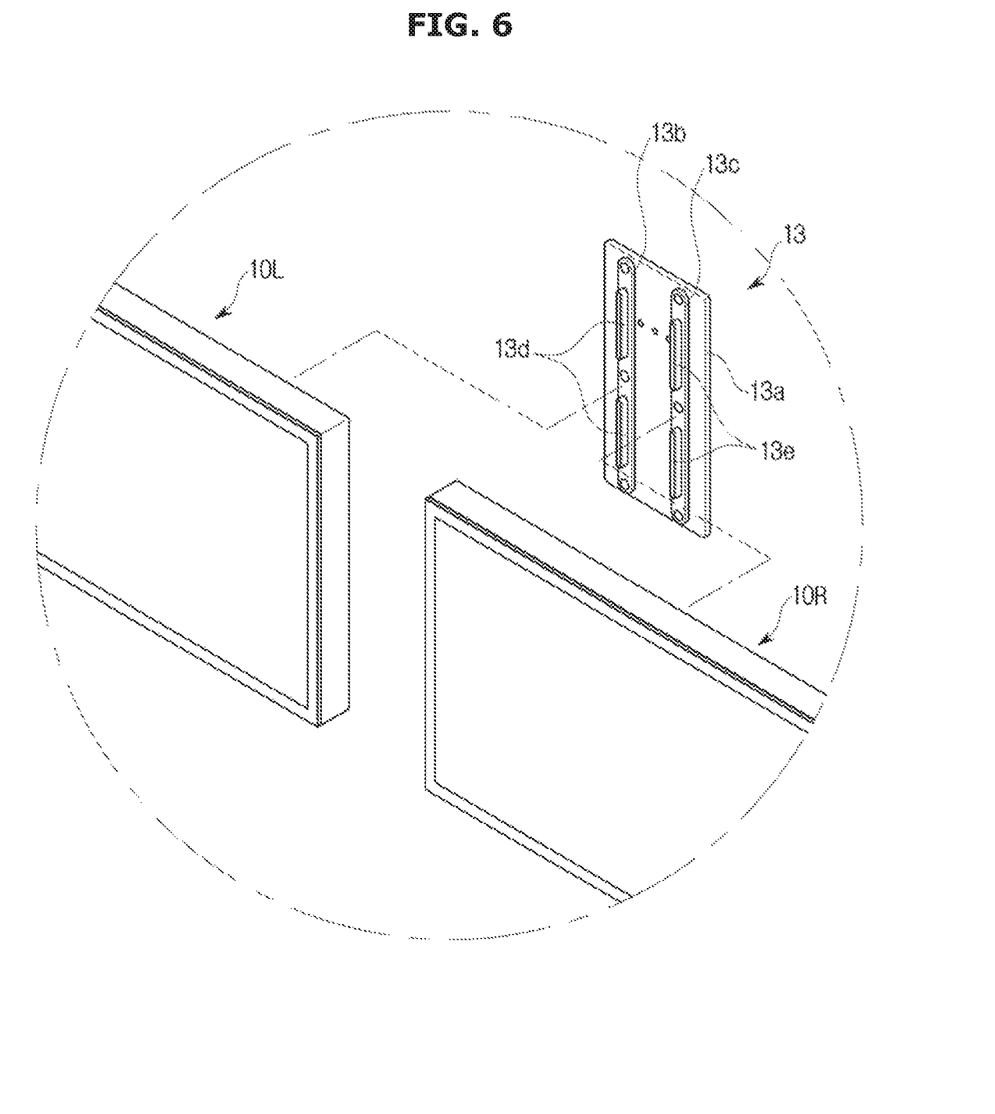
FIG. 6 is a front exploded perspective view illustrating that a connector is connected to displays in a display apparatus according to a first embodiment of the present disclosure.
Figure 7:
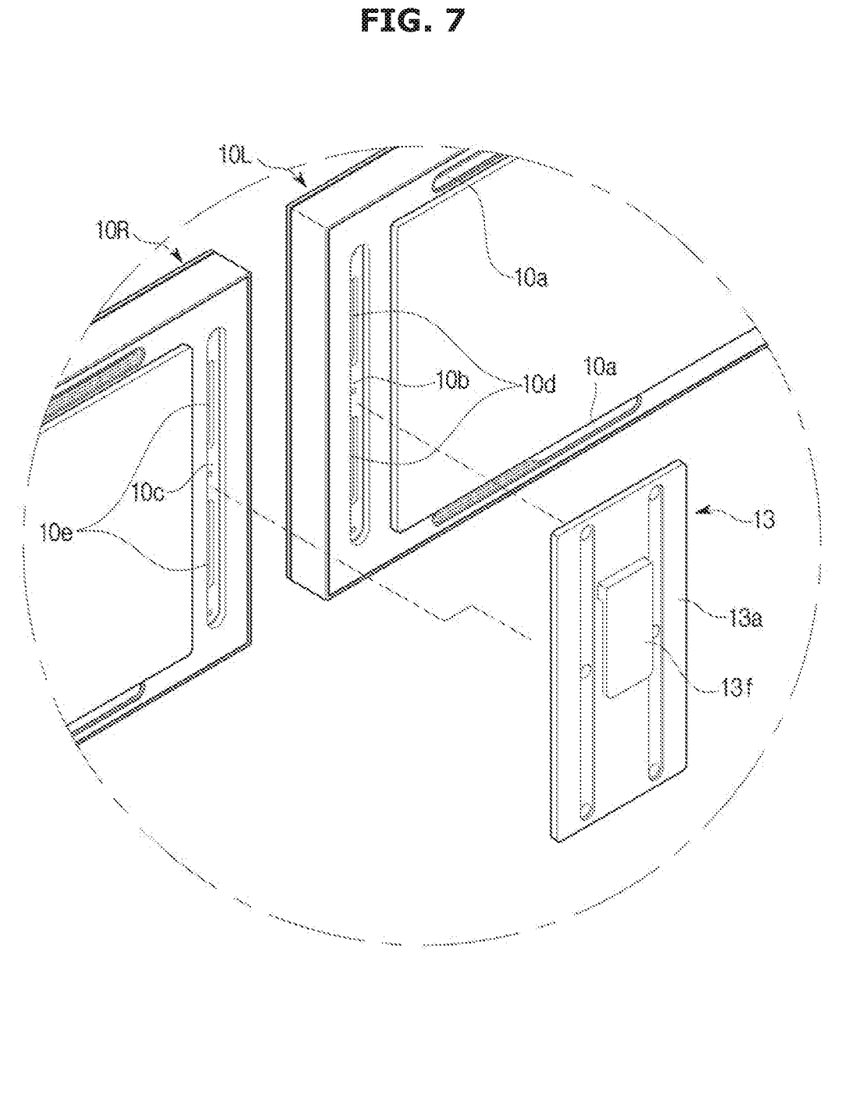
FIG. 7 is a rear exploded perspective view illustrating that a connector is connected to displays in a display apparatus according to a first embodiment of the present disclosure.

As illustrated in FIGS. 6 and 7, the display apparatus 1 further includes a connector 13 to not only couple the two adjacent first and second displays 10L and 10R, but also electrically connect the two adjacent first and second displays 10L and 10R.

That is, the connector 13 is coupled to the adjacent ends of the first display 10L and the second display 10R which are disposed adjacent to each other so that the adjacent ends of the first display 10L and the second display 10R are coupled to each other and the first display 10L and the second display 10R are electrically connected to each other.

The connector 13 includes a connector base 13*a* formed in the shape of a rectangular plate and first and second coupling protrusions 13*b* and 13*c* protruding forward from a front surface of the connector base 13*a*.

The connector base 13*a* is fixed to the adjacent ends of the rear surfaces of the first display 10L and the second display 10R through a fastening member such as a screw.

The first and second coupling protrusions 13*b* and 13*c* each extend long in the vertical direction, the first coupling protrusion 13*b* protrudes from one side of the front surface of the connector base 13*a* and is coupled to the first display 10L, and the second coupling protrusion 13*c* protrudes from the other side of the front surface of the connector base 13*a* and is coupled to the second display 10R. As illustrated in FIG. 6, the first coupling protrusion 13*b* protrudes from the left side of the front surface of the connector base 13*a*, and the second coupling protrusion 13*c* protrudes from the right side of the front surface of the connector base 13*a*.

The first display 10L and the second display 10R each include a pair of coupling grooves 10*b* and 10*c* provided on opposite sides of the rear surface of the first and second displays 10L and 10R and to which one of the first coupling protrusion 13*b* and the second coupling protrusion 13*c* is coupled. For convenience, the coupling groove 10*b* provided on the right side of the rear surface of the first and second displays 10L and 10R and coupled with the first coupling protrusion 13*b* is referred to as the first coupling groove 10*b*, and the coupling groove 10*c* provided on the left side of the rear surface of the first and second displays 10L and 10R and coupled with the second coupling protrusion 13*c* is referred to as the second coupling groove 10*c*.

As described above, the connector 13 electrically connects the first display 10L and the second display 10R, which are adjacent to each other, to allow power and signals to be transmitted from one of the first and second displays 10L and 10R to the other.

Therefore, since only one of the first and second displays 10L and 10R receives power and signals through a cable, and the other one of the first and second displays 10L and 10R receives the power and signals from the adjacent one display through the connector 13, the display apparatus 1 may have a large number of displays without requiring a large number of cables.

To this end, the connector 13 includes plug portions 13*d* and 13*e* protruding from the first and second coupling protrusions 13*b* and 13*c*, respectively, and the first and second displays 10L and 10R include socket portions 10*d* and 10*e* recessed in the first and second coupling grooves 10*b* and 10*c*, respectively.

Specifically, the first coupling protrusion 13*b* is provided with two of the first plug portions 13*d* which are spaced apart from each other in a vertical direction, and the second coupling protrusion 13c is provided with two of the second plug portions 13e which are spaced apart from each other in a vertical direction. Similarly, the first coupling groove 10b is provided with two of the first socket portions 10d which are spaced apart from each other in a vertical direction, and the second coupling groove 10c is provided with two of the second socket portions 10e which are spaced apart from each other in a vertical direction.

Accordingly, as the connector 13 is coupled to the adjacent ends of the rear surfaces of the first display 10L and the second display 10R, the first coupling protrusion 13b is inserted into the first coupling groove 10b and the second coupling protrusion 13c is inserted into the second coupling groove 10c. At the same time, the first plug portions 13d are connected to the first socket portions 10d, and the second plug portions 13e are connected to the second socket portions 10e.

Accordingly, the first display 10L and the second display 10R are coupled to each other through the connector 13 and at the same time electrically connected to each other.

The connector 13 may include the clip portion 13f protruding from a rear surface of the connector base 13a and extending downward. Therefore, since the connector 13 may be mounted on the mounting bracket through the clip portion 13f, the connector 13 may perform the same function as the clip member 12.

The present embodiment exemplifies that the first and second plug portions 13d and 13e are provided on the connector 13 and the first and second socket portions 10d and 10e are provided on the first and second displays 10L and 10R, but the present disclosure is not limited thereto. Conversely, it is also possible that the first and second socket portions 10d and 10e are provided on the connector 13, and the first and second plug portions 13d and 13e are provided on the first and second displays 10L and 10R.

Figure 8:
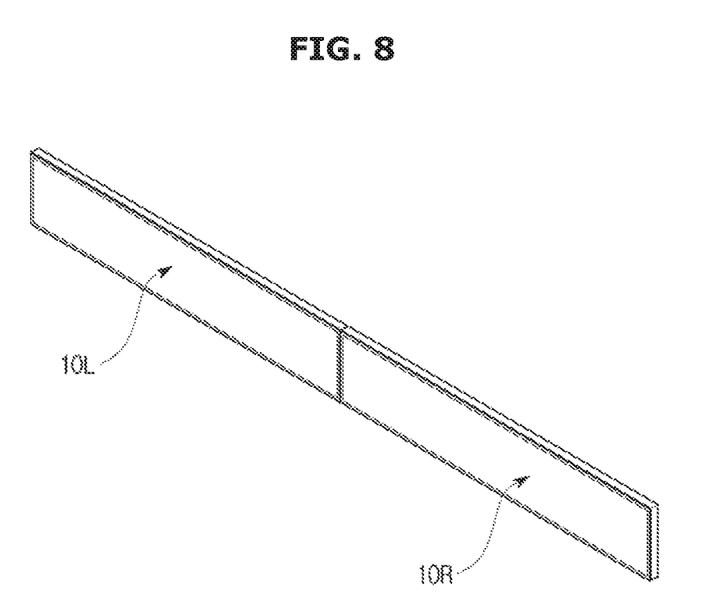
FIG. 8 is a perspective view of a display apparatus according to a second embodiment of the present disclosure.

As described above, the display apparatus 1 includes the frame 11, but the present disclosure is not limited thereto. That is, as shown in FIG. 8 illustrating a second embodiment of the present disclosure, the display apparatus 1 may not include the frame 11.

Also, as described above, the display apparatus 1 is used in a state in which the two first and second displays 10L and 10R are connected to each other, but the present disclosure is not limited thereto. For example, the display apparatus 1 may be used in a state in which three or more displays are connected to each other.

Also, as described above, a plurality of the two first and second displays 10L and 10R are arranged to contact each other in the left-right direction, but the present disclosure is not limited thereto. That is, a plurality of displays may be arranged to contact each other in the vertical direction.

Hereinafter, a display apparatus according to a third embodiment of the present disclosure will be described in detail with reference to the drawings.

Figure 9:
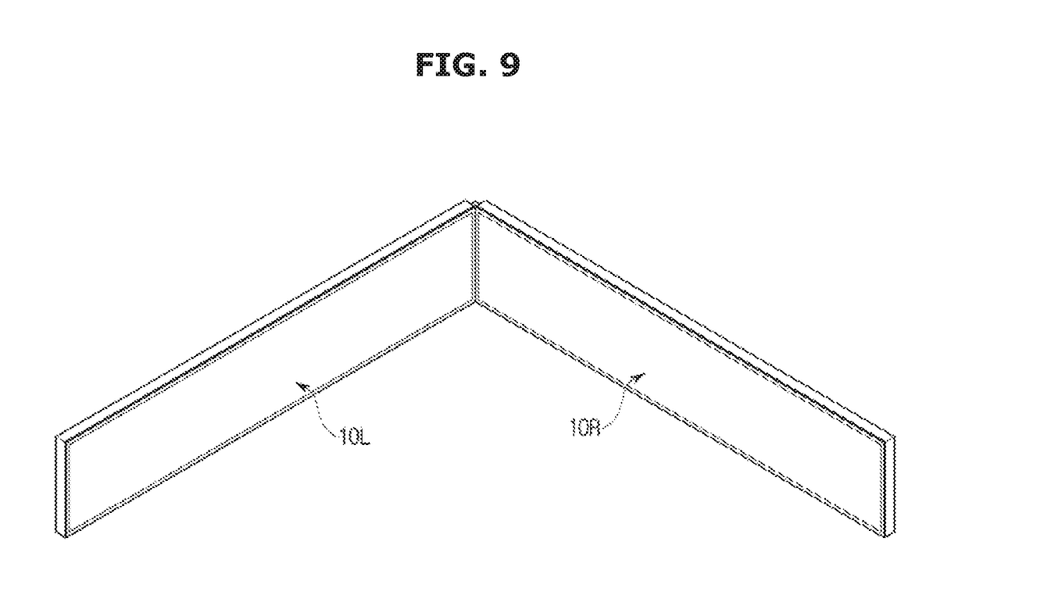
FIG. 9 is a perspective view of a display apparatus according to a third embodiment of the present disclosure.
Figure 10:
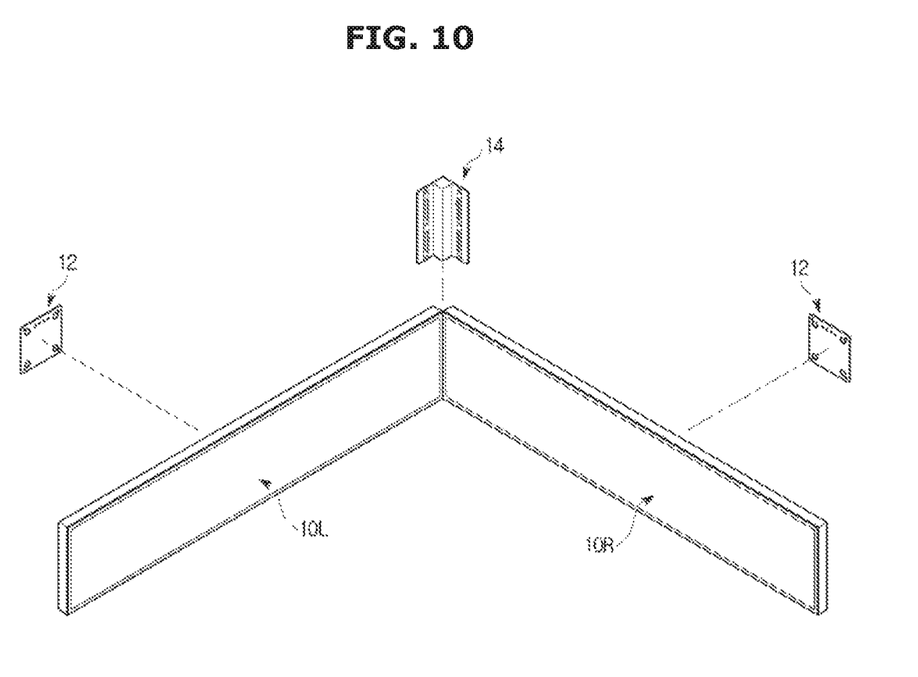
FIG. 10 is an exploded perspective view of a display apparatus according to a third embodiment of the present disclosure.

As illustrated in FIGS. 9 and 10, the display apparatus 1 according to a third embodiment of the present disclosure includes the first and second displays 10L and 10R, and a connector 14 coupled to the adjacent ends of the first display 10L and the second display 10R to couple the first display 10L and the second display 10R to each other.

The two first and second displays 10L and 10R are formed in the shape of a long rectangular plate elongated in the left-right direction and are arranged at right angles to each other, and are installed at a corner of a wall.

Figure 11:
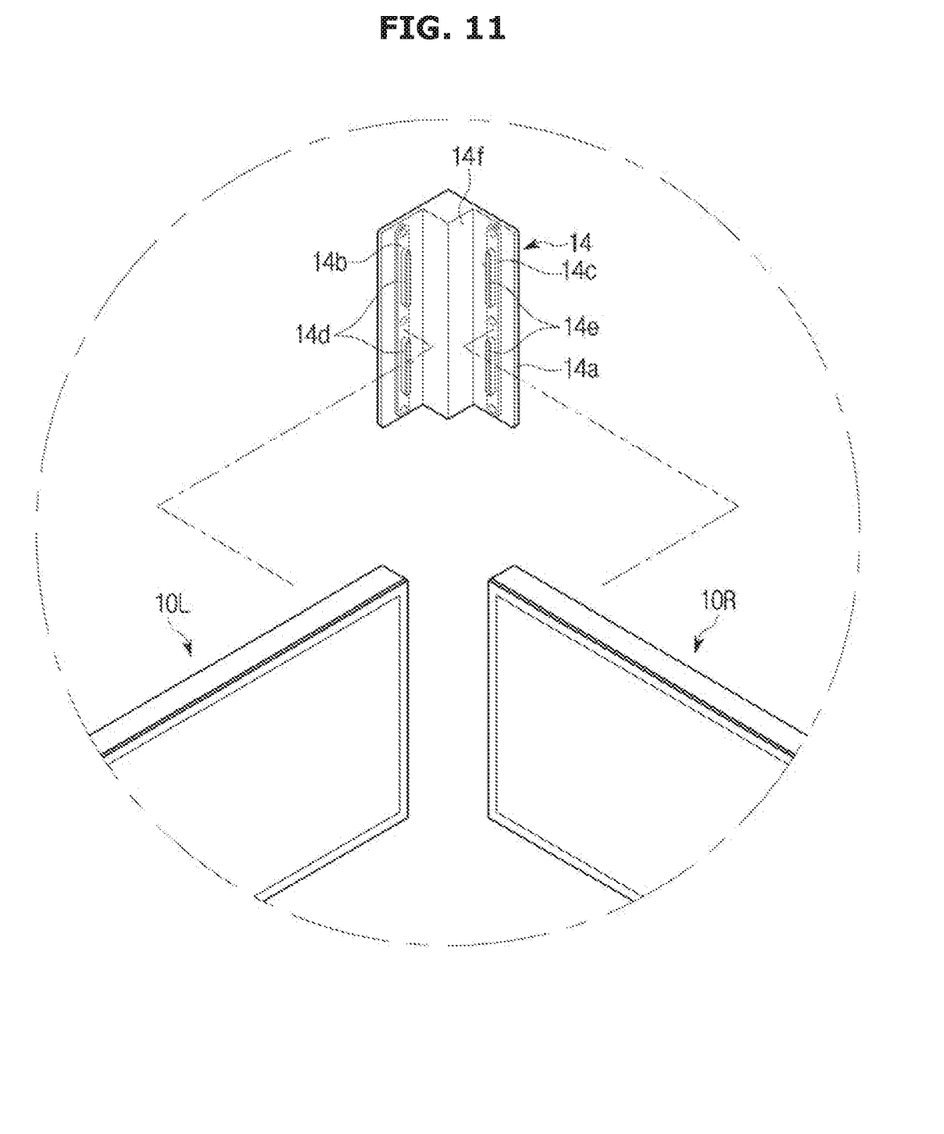
FIG. 11 is a front exploded perspective view illustrating that a connector is connected to displays in a display apparatus according to a third embodiment of the present disclosure.
Figure 12:
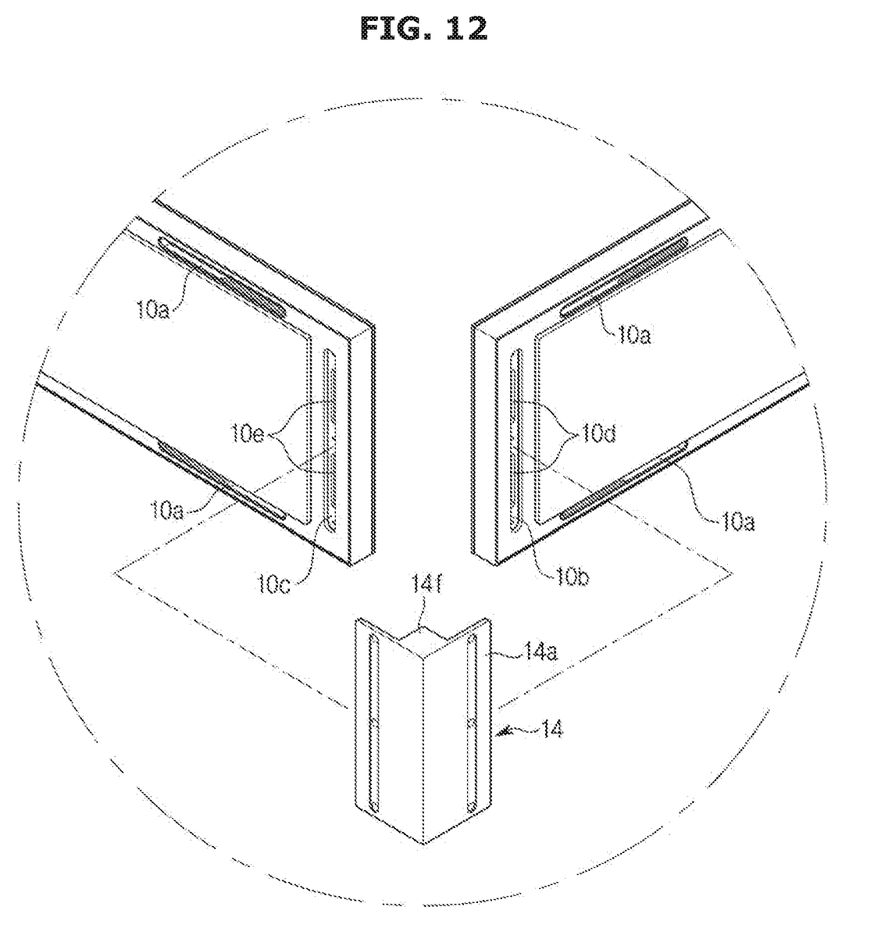
FIG. 12 is a rear exploded perspective view illustrating that a connector is connected to displays in a display apparatus according to a third embodiment of the present disclosure.

As illustrated in FIGS. 11 and 12, the connector 14 includes a connector base 14a formed to have an L-shaped horizontal cross section, a first coupling protrusion 14b protruding from one side of a front surface of the connector base 14a to be coupled to the first display 10L, a second coupling protrusion 14c protruding from the other side of the front surface of the connector base 14a to be coupled to the second display 10R, first plug portions 14d protruding from the first coupling protrusion 14b to be connected to the first display 10L, and second plug portions 14e protruding from the second coupling protrusion 14c to be connected to the second display 10R. Also, the connector 14 includes a support portion 14f provided in the shape of a square protrusion on an inner side of a corner forming portion to support adjacent side ends of the first display 10L and the second display 10R.

The first display 10L and the second display 10R include the first coupling groove 10b provided on one side of the rear surface thereof and to which the first coupling protrusion 14b is coupled, the second coupling groove 10c provided on the other side of the rear surface thereof and to which the second coupling protrusion 14c is coupled, the first socket portions 10d provided in the first coupling groove 10b and to which the first plug portions 14d are connected, and the second socket portions 10e provided in the second coupling groove 10c and to which the second plug portions 14e are connected.

Accordingly, the first display 10L and the second display 10R are coupled at right angles to each other through the connector 14 and at the same time electrically connected to each other.

The third embodiment exemplifies that the first and second plug portions 14d and 14e are provided on the first and second coupling protrusions 14b and 14c, respectively, and the first and second socket portions 10d and 10e are provided on the first and second coupling grooves 10b and 10c, respectively, but the present disclosure is not limited thereto.

Figure 13:
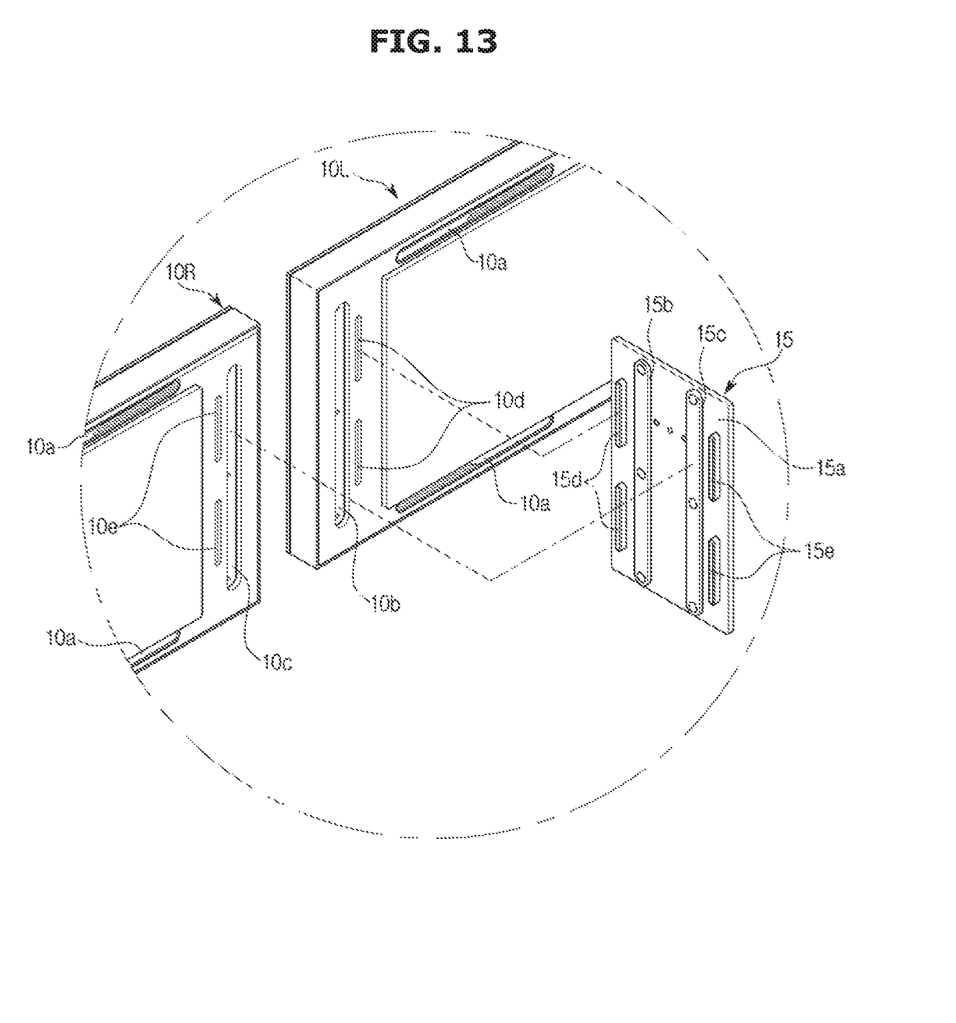
FIG. 13 is an exploded perspective view illustrating that a connector is connected to displays in a display apparatus according to a fourth embodiment of the present disclosure.

For example, as shown in FIG. 13 illustrating a display apparatus according to a fourth embodiment of the present disclosure, a connector 15 is provided to couple the first display 10L and the second display 10R. The connector 15 including plug portions 15d and 15e, a connector base 15a and coupling protrusions 15b and 15c. Plug portions 15d and 15e provided to protrude from a front surface of a connector base 15a separately from coupling protrusions 15b and 15c, and the first and second socket portions 10d and 10e are formed to be recessed at opposite sides of the rear surface of the first display 10L and the second display 10R separately from the first and second coupling grooves 10b and 10c.

Therefore, when the connector 15 couples the first display 10L and the second display 10R, the plug portions 15d and 15e are connected to the first socket portion 10d and the second socket portion 10e, respectively so that the first display 10L and the second display 10R are electrically connected by the connector 15. Further, the coupling protrusions 15b and 15c are coupled to the first coupling groove 10b and the second coupling groove 10c.

As is apparent from the above, a display apparatus according to an embodiment of the present disclosure can be easily manufactured because the display apparatus includes a plurality of displays capable of being easily connected to each other.

Although a few embodiments of the present disclosure have been shown and described, it would be appreciated by those skilled in the art that changes may be made in these embodiments without departing from the principles and spirit of the present disclosure in the scope of which is defined in the claims and their equivalents.

What is claimed is:

1. A display apparatus comprising:
   a plurality of displays including:
   a plurality of coupling grooves recessed from a rear surface of each of the plurality of displays; and
   a plurality of socket portions further recessed from the plurality of coupling grooves; and
   a connector positioned behind the plurality of displays to couple the plurality of displays together so that adjacent ends of the plurality of displays are arranged next to each other, the connector including:
   a connector base;
   a plurality of coupling protrusions protruded from a front surface of the connector base to be accommodated in the corresponding coupling grooves to couple the plurality of displays together; and
   a plurality of plug portions further protruded from the coupling protrusions to electrically connect the plurality of displays together.

2. The display apparatus according to claim 1, wherein the connector base is formed in a shape of a flat plate.

3. The display apparatus according to claim 1, wherein:
   the adjacent displays, which are coupled together by the connector, include a first display and a second display disposed adjacent to the first display; and
   one of the plurality of coupling protrusions of the connector is accommodated in the coupling groove of the first display, and an other one of the plurality of coupling protrusions of the connector is accommodated in the coupling groove of the second display to couple the first display and the second display together.

4. The display apparatus according to claim 3, wherein:
   the plurality of plug portions are respectively protruded from the one of the plurality of coupling protrusions of the connector and the other one of the plurality of coupling protrusions of the connector; and
   the socket portions are respectively recessed from the coupling groove of the first display and from the coupling groove of the second display so that the plurality of plug portions are respectively accommodated in the socket portion of the first display and the socket portion of the second display to electrically connect the first display and the second display together.

5. The display apparatus according to claim 3, wherein:
   the connector further includes a clip portion protruding from a rear surface of the connector base and extending downward.

6. The display apparatus according to claim 1,
   wherein the connector base has a L-shaped horizontal cross section.

7. The display apparatus according to claim 6, wherein:
   the adjacent displays, which are coupled together by the connector, include a first display and a second display disposed adjacent to the first display; and
   the connector further includes a support portion provided in a shape of a square protrusion on an inner side of a corner forming portion to support adjacent side ends of the first display and the second display.

8. The display apparatus according to claim 1, further comprising:
   an upper plate mounted on an upper end of the plurality of displays; and
   a lower plate mounted on a lower end of the plurality of displays.

9. The display apparatus according to claim 8, wherein:
   each of the upper plate and the lower plate includes a fixed rail to fix the upper plate and the lower plate to the plurality of displays; and
   each of the plurality of displays includes a fixing slot into which the fixed rail is inserted.

10. The display apparatus according to claim 9, wherein:
    the upper plate and the lower plate include one or more fixed rails on a rear surface thereof and to fix the upper plate and the lower plate to the plurality of displays by inserting the one or more fixed rails to the one or more fixing slots, respectively,
    the one or more fixed rails include a L-shaped body, and a head formed at an end of the L-shaped body, and the head has a thickness larger than the L-shaped body, and
    the fixing slots are horizontally provided at upper and lower ends of the rear surface of the plurality of displays, respectively, and include a passing portion formed to have a vertical width larger than a thickness of the head to accommodate the head thereof by inserting the head into the passing portion, and a locking portion formed to have a vertical width smaller than the thickness of the head so that when the head is accommodated in the passing portion and moves to the locking portion, the head is secured in the locking portion.

11. The display apparatus according to claim 8, further comprising:
    a pair of side plates mounted on opposite ends of the plurality of displays.

12. The display apparatus according to claim 1, wherein:
    the plurality of displays extend horizontally and are arranged to be horizontally adjacent to each other.

13. The display apparatus according to claim 1, wherein:
    the plurality of displays extend vertically and are arranged vertically adjacent to each other.

14. A display apparatus comprising:
    a plurality of displays arranged adjacent to each other, each of the plurality of displays including one or more fixing slots;
    an upper plate mounted on an upper end of the plurality of displays; and
    a lower plate mounted on a lower end of the plurality of displays,
    wherein the upper plate and the lower plate include one or more fixed rails to fix the upper plate and the lower plate to the plurality of displays by inserting the one or more fixed rails to the one or more fixing slots, respectively,
    wherein the one or more fixed rails include a L-shaped body, and a head formed at an end of the L-shaped body, and
    wherein the fixing slots are horizontally provided at upper and lower ends of a rear surface of the plurality of displays, respectively, and include a passing part formed to have a vertical width larger than a thickness of the head to accommodate the head thereof by inserting the head into the passing part, and a locking part formed to have a vertical width smaller than the thickness of the head so that when the head moves to the locking part and is accommodated in the passing part, the head is secured in the locking part.

15. The display apparatus according to claim 14, further comprising:
    a pair of side plates mounted on opposite ends of each of the adjacent displays.

* * * * *